United States Patent
Meredith et al.

(10) Patent No.: US 11,102,713 B2
(45) Date of Patent: Aug. 24, 2021

(54) SELECTIVE OFFLOADING OF CELLULAR SUBSCRIBER TO WLAN BASED ON CELL UTILIZATION

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Brandon B. Hilliard, Canton, GA (US); Zachary Meredith, Fairbanks, AK (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 60 days.

(21) Appl. No.: 16/600,138

(22) Filed: Oct. 11, 2019

(65) Prior Publication Data
US 2021/0112488 A1    Apr. 15, 2021

(51) Int. Cl.
*H04W 48/16* (2009.01)
*H04W 48/06* (2009.01)
(Continued)

(52) U.S. Cl.
CPC ............ *H04W 48/16* (2013.01); *H04W 8/20* (2013.01); *H04W 12/06* (2013.01); *H04W 16/14* (2013.01); *H04W 48/06* (2013.01)

(58) Field of Classification Search
CPC ....... H04W 8/20; H04W 12/06; H04W 16/14; H04W 48/06; H04W 48/16
See application file for complete search history.

(56) References Cited

U.S. PATENT DOCUMENTS

| | | | |
|---|---|---|---|
| 8,867,490 B1 * | 10/2014 | Krishna | ............ H04W 36/0011 370/331 |
| 9,173,144 B2 | 10/2015 | Singh et al. | |

(Continued)

OTHER PUBLICATIONS

"Architecture for Mobile Data Offload over Wi-Fi Access Networks", © 2012 Cisco and/or its affiliates. All rights reserved. This document is Cisco Public Information., White Paper, 2012, 23pgs.

(Continued)

*Primary Examiner* — Wayne H Cai
(74) *Attorney, Agent, or Firm* — Guntin & Gust, PLC; Dana Lemoine

(57) ABSTRACT

Aspects of the subject disclosure may include, for example, receiving a request to permit equipment of a subscriber of a mobile service provider that provides a subscribed service via a licensed frequency spectrum to access the subscribed service via a wireless access terminal according to an unlicensed frequency spectrum. A radio adapted to provide access to the subscribed service via the licensed frequency spectrum is identified, wherein the wireless access terminal resides within a coverage area of the identified radio. A current utilization of the identified radio is determined and a response to the request is generated according to the current utilization of the identified radio, wherein access to the subscribed service via the wireless access terminal is conditional according to the response to the request, resulting in conditional access. Other embodiments are disclosed.

20 Claims, 10 Drawing Sheets

(51) Int. Cl.
*H04W 8/20* (2009.01)
*H04W 12/06* (2021.01)
*H04W 16/14* (2009.01)

(56) References Cited

U.S. PATENT DOCUMENTS

| | | |
|---|---|---|
| 9,648,550 B2 | 5/2017 | Zhao et al. |
| 9,743,327 B2 | 8/2017 | Wang et al. |
| 2014/0126360 A1 | 5/2014 | Rong et al. |
| 2015/0215839 A1 | 7/2015 | Johansson et al. |
| 2015/0249950 A1 | 9/2015 | Teyeb et al. |
| 2016/0212695 A1* | 7/2016 | Lynch .................. H04W 48/18 |
| 2016/0242088 A1 | 8/2016 | Wang et al. |
| 2017/0055302 A1 | 2/2017 | Wang et al. |
| 2018/0192326 A1* | 7/2018 | Sirotkin ............ H04W 28/0247 |

OTHER PUBLICATIONS

"Integrating WI-FI and Cellular Networks", WP_WiFiCoreIntegration_052616, May 26, 2016, 10pgs.

Gaspar, Peter, "WiFiOffload Architectures", © 2011 Cisco and/or its affiliates. All rights reserved, 2011, 70pgs.

* cited by examiner

FIG. 2D
260

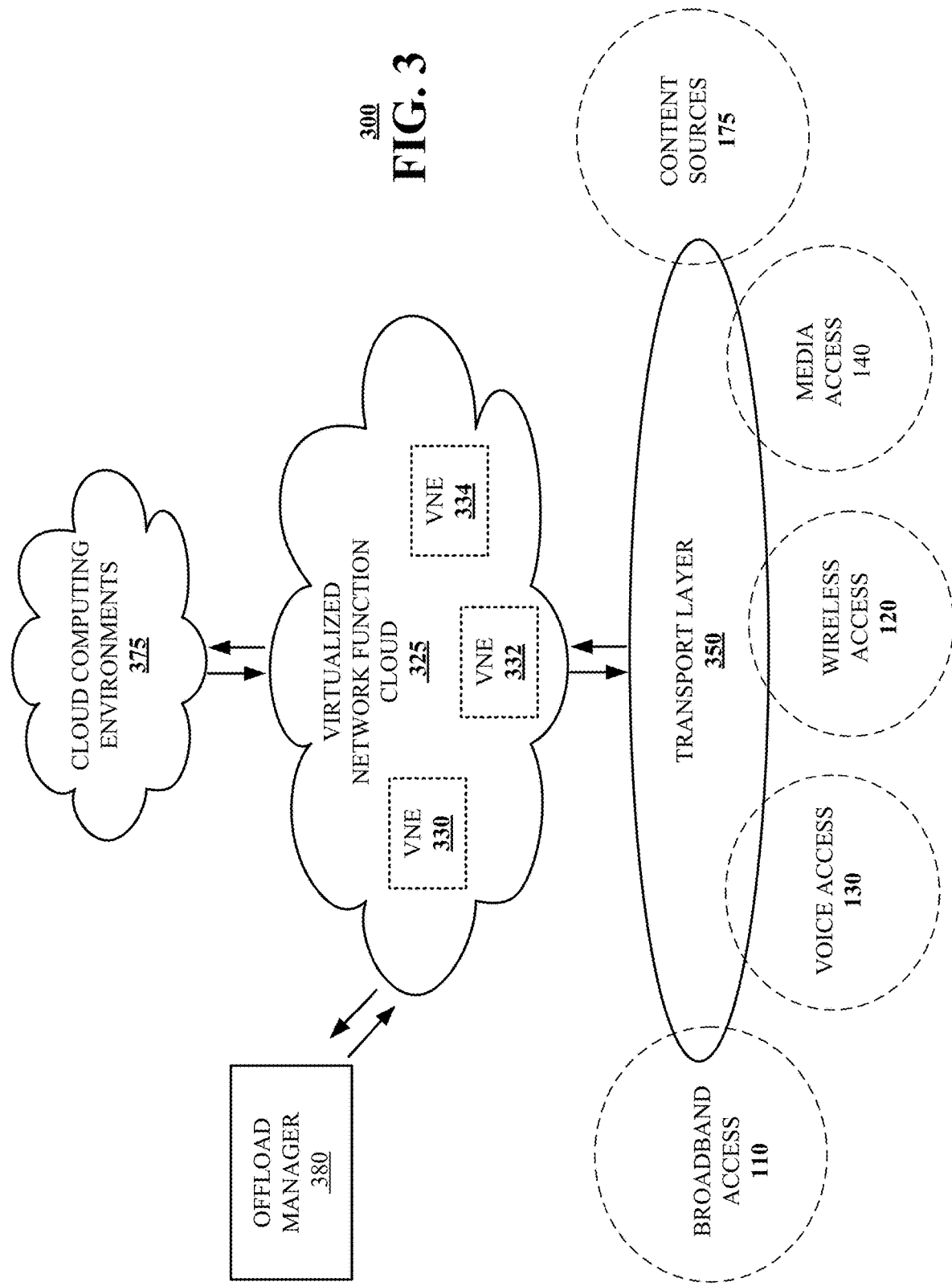

SELECTIVE OFFLOADING OF CELLULAR SUBSCRIBER TO WLAN BASED ON CELL UTILIZATION

FIELD OF THE DISCLOSURE

The subject disclosure relates to selective offloading of cellular subscriber to WLAN based on cell utilization.

BACKGROUND

Non-3GPP devices, such as Wireless Fidelity (WiFi) represent technologies that allow wireless terminals such as personal computers or a handheld devices (e.g., smart phones, tablets) to access a wireless local area network (WLAN) in a wireless manner. In at least some applications, wireless access points are provided in conjunction with routers that are adapted to connect the wireless access points to internet protocol (IP) connections. Wireless access points, sometimes referred to as WiFi hotspots, are commonly available in places such airports, cafes, hotels, bookstores, campuses, and the like, which enable a user access emails, web pages, and streaming media, and provide wireless broadband Internet access for the user. Some mobile service providers even offer WiFi voice services, allowing their subscribers to engage in voice calls over broadband IP connections.

In at least some instances, mobile cellular service providers offload at least a portion of their licensed network traffic, e.g., 2G, 3G, 4G, LTE, onto unlicensed spectrum, e.g., WLAN operating according to IEEE 802.11 standards. In some instances the mobile cellular service providers operate and maintain their own WiFi hotspots, while in other instances, they rely on agreements with third party providers, such as Boingo® Wireless, Inc., WiFi service provider, that provide turn-key WiFi solutions.

BRIEF DESCRIPTION OF THE DRAWINGS

Reference will now be made to the accompanying drawings, which are not necessarily drawn to scale, and wherein:

FIG. 2D is a schematic diagram illustrating an example, non-limiting embodiment of a map resource that supports a wireless local area network offload system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
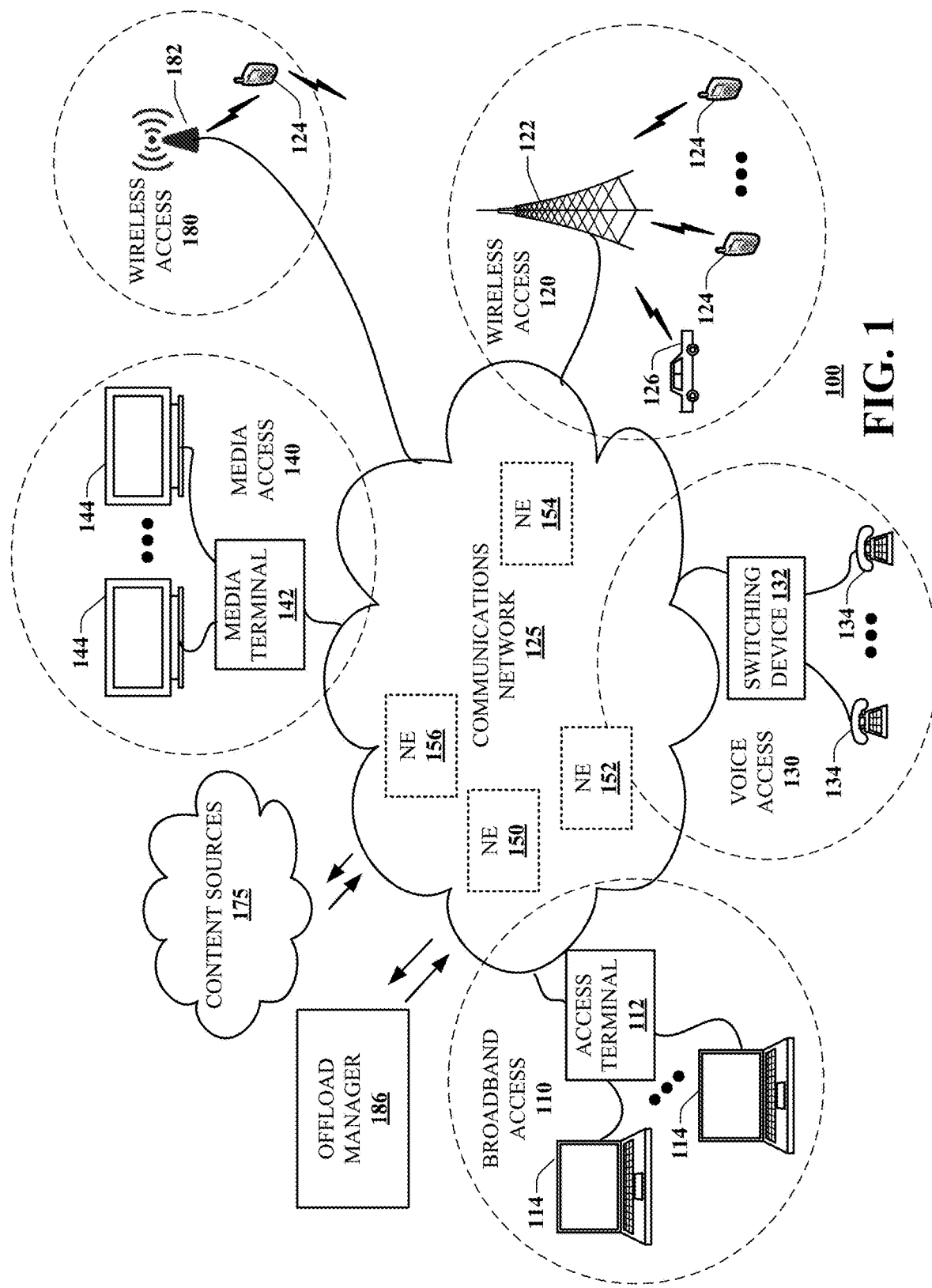
FIG. 1 is a block diagram illustrating an exemplary, non-limiting embodiment of a communications network in accordance with various aspects described herein.

The subject disclosure describes, among other things, illustrative embodiments for controlling offloading of subscriber equipment of a 3GPP service to a non-3GPP wireless access point based on identities of the subscriber equipment and a utilization of a 3GPP radio providing coverage that overlaps a coverage area of the non-3GPP wireless access point. It is understood that in some applications, a mobile service provider providing mobile cellular service, e.g., 3GPP service, to mobile subscriber equipment may have predetermined arrangements adapted to offload, or otherwise service, at least a portion of their subscribers via non-cellular radios other than those used in traditional macro cells.

One or more aspects of the subject disclosure include a device, having a processing system including a processor, and a memory that stores executable instructions that, when executed by the processing system, facilitate performance of operations. The operations include receiving a request to permit equipment of a subscriber of a mobile service provider that provides a subscribed service via a licensed frequency spectrum to access the subscribed service via a wireless access terminal according to an unlicensed frequency spectrum; identifying a radio, to obtain an identified radio, adapted to provide access to the subscribed service via the licensed frequency spectrum, wherein the wireless access terminal resides within a coverage area of the identified radio. The operations further include determining a current utilization of the identified radio and generating a response to the request according to the current utilization of the identified radio, wherein access to the subscribed service via the wireless access terminal is conditional according to the response to the request, resulting in conditional access.

One or more aspects of the subject disclosure include a process that includes receiving, by a processing system including a processor, a request to permit equipment of a subscriber of a mobile service provider that provides a subscribed service via a licensed frequency spectrum to access the subscribed service via a wireless access terminal according to an unlicensed frequency spectrum. The process further includes identifying, by the processing system, a radio, to obtain an identified radio, adapted to provide access to the subscribed service via the licensed frequency spectrum, wherein the wireless access terminal resides within a coverage area of the identified radio. A utilization of the identified radio is determined by the processing system and a response to the request is provided by the processing system, according to the utilization of the identified radio, wherein access to the subscribed service via the wireless access terminal is conditional according to the response to the request, resulting in conditional access.

One or more aspects of the subject disclosure include a non-transitory, machine-readable medium, including executable instructions that, when executed by a processing system including a processor, facilitate performance of operations. The operations include receiving a request to permit equipment of a subscriber of a mobile service provider that provides a subscribed service via a licensed frequency spectrum to access the subscribed service via a wireless access terminal according to an unlicensed frequency spectrum. The operations further include identifying a radio, to obtain an identified radio, adapted to provide access to the subscribed service via the licensed frequency spectrum, wherein the wireless access terminal resides within a coverage area of the identified radio. A utilization of the identified radio is determined and a response to the request is initiated according to the utilization of the identified radio, wherein access to the subscribed service via the wireless access terminal is conditional according to the response to the request, resulting in conditional access.

Cellular radios operate in managed, e.g., licensed frequency spectra, such that any particular cellular radio provides wireless service over a fixed channel, a fixed number of channels and/or according to a maximum available bandwidth. Consequently, any particular cellular radio has limits as to one or more of a number of mobile devices to which it may be attached, a number of mobile applications that may be serviced, the types of applications served, quality of service (QoS) levels available, bandwidth, and so on. Overutilization of a cellular radio may impact at least some subscribers' experiences, e.g., by introducing interference, delays and/or loss of connectivity to services including time sensitive applications, such as voice or video.

As mobile service infrastructures mature and wireless network build-outs progress, it is not uncommon to have overlapping wireless coverage from other radios and/or radio other channels of the same cellular radio, cellular radios of other nearby cell sites, and/or from other radios distinguishable from those serving traditional macro-cells. As used herein, the term 3GPP is used without limitation to indicate wireless service, including mobile cellular service, provided according to standards of the 3rd Generation Partnership Project (3GPP) standard organization, such as 2G, 3G, 4G, LTE, 5G. Likewise, the term non-3GPP is used without limitation to indicate other wireless services, including non-cellular services, such as WLANs and those conforming to IEEE 802.11 wireless networking standards. The non-cellular radios used in the examples disclosed herein include WLAN access points, e.g., WiFi hotspots, such that a 3GPP service provider may handoff subscribers to a non-licensed frequency service. It is understood, however, that in at least some embodiments, the non-cellular radios can include small cell radio access points, such as micro cells, femto cells and/or pico cells. According to the latter, it is possible that offloading occurs between licensed frequency service of a traditional, or macro cell and licensed frequency of geographically restricted cells.

Reference to offloading, handoff or handover as used herein generally refers to equipment of a mobile cellular service subscriber being served by any wireless means other than a 3GPP or macro cell site, while being present at a location falling within wireless coverage of such a site. Although the examples provided herein typically disclose offloading from a 3GPP to a non-3GPP or WLAN access point, it is understood that the offloading techniques disclosed herein may be applied in a similar manner, from a non-3GPP or WLAN to a 3GPP or macro cellular service.

Such offloading may occur, without limitation, upon initial power on of a mobile device, in which an instance the mobile device may not be attached to any macro cells. Alternatively or in addition, offloading may occur after a mobile device has attached to or otherwise serviced or supported by a macro cell while the mobile device is not currently engaged in any active service. Alternatively or in addition, offloading can occur while the mobile device is engaged in an active service, e.g., streaming video, voice, data, and the like.

A control of offloading may permit a predetermined portion, e.g., a percentage, of requesting subscriber devices to be offloaded, e.g., to a non-3GPP wireless access point based, on a utilization of a so-called nearby 3GPP radio providing overlapping wireless coverage, while denying another portion, e.g., a remainder, of requesting subscriber devices from offloading. In at least some embodiments, denial of offloading is applied in a consistent and repeatable manner, such that a requesting mobile device having been denied service according to the imposed percentage or portion, is consistently denied in any subsequent requests that might occur within a predetermined period. Other embodiments are described in the subject disclosure.

In some applications, the non-3GPP access points are operated and maintained by the same mobile service provider operating and maintaining nearby 3GPP equipment providing the overlapping wireless coverage. Alternatively or in addition, at least some of the non-3GPP access points are operated and/or maintained by a different entity than the mobile service provider, referred to as a third party. In such instances, offloading may still be permitted, but the mobile service provider may be charged, e.g., a rate on a per-gigabyte basis by the third party for any offloaded traffic. It is understood that in at least some instances, the offloading occurs without requiring user input from the mobile device being offloaded. For example, a user may observe an indication at a display of the mobile device indicating the device is being serviced according to a WiFi service and not a 3GPP, service without the user having entered any username, password, passcode, or any other input when within range of the WiFi access point. Such access credentials may be provided to an operator of the WiFi access point by an authentication service, such as the 3GPP service provider, and/or an authentication service provider retained by the 3GPP service provider, to authentication and/or authorize the requesting user and/or mobile device of the requesting user.

In at least some instances, offloading to WiFi may incur additional costs to the 3GPP service provider, such as offloading to third-party access point providers, such as Boingo® Wireless, Inc., a provider of mobile Internet access for wireless-enabled consumer devices. In such instances, the 3GPP service provider may impose restrictions on offloading. For example, if radios of a macro-cell of the 3GPP service provider providing overlapping coverage to the WiFi hotspot, are not over utilized, the 3GPP service provider may prefer to provide service via the licensed spectra of the 3GPP or macro-cell. However, when utilization reaches and/or exceeds a certain level, e.g., a threshold, mobile devices of at least some subscribers requesting offload may be allowed to offload to the WiFi hotspot.

Referring now to FIG. 1, a block diagram is shown illustrating an example, non-limiting embodiment of a communications network 100 in accordance with various aspects described herein. For example, communications network 100 can facilitate in whole or in part responding to a request for offloading subscriber equipment to a non-3GPP wireless access point based on an identity of the subscriber equipment and a utilization of a 3GPP radio providing coverage that overlaps a coverage area of the non-3GPP wireless access point. The response may permit a predetermined percentage of requesting subscriber devices to offload to the non-3GPP wireless access point based on the utilization of the 3GPP radio, while denying a balance of requesting subscriber devices from offloading. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The wireless access 120 may provide access to licensed frequency spectra, e.g., according to 3GPP service, such as 2G, 3G, LTE, and the like. The base station 122 include one or more radios adapted to provide subscribed services, such as 3GPP service to the mobile devices 124, 126. The radios generally provide a finite or limited access resource, such as bandwidth. For example, the radio provides a number of resource blocks to support subscribed services to the mobile devices 124. The amount, e.g., percentage, of available resources blocks utilized at any given moment may depend upon various factors, such as the number of mobile devices 124 being serviced, the number of applications being served, understanding that one mobile device 124 may engage in more than one service simultaneously, the types of applications, e.g., voice, video, data. The amount of resources being consumed, e.g., number or percentage of resource blocks being utilized can be referred to as a utilization of the radio resource. As the utilization approaches 100%, it is conceivable that some subscribers experiences may fall short of expected levels of quality, capacity and so on.

In some architectures, the communications network 100 includes other wireless access points 180, such as so called small-cell, e.g., femto cell, or pico cell, operating in licensed spectra, but over extremely small or localized areas. Alternatively or in addition, the wireless access points 180 can include non-3GPP wireless access point 180, e.g., operating in unlicensed frequency spectra. Examples include, without limitation IEEE 802.11 WLANS, e.g., WiFi, Bluetooth, WiMax and the like. It is common for mobile devices 124, 126 to include multiple radios adapted to operate in either or both of a 3GPP domain and a non-3GPP domain. Beneficially, mobile service providers can support mobility between 3GPP wireless access points 120 and non-3GPP access points 180. This mobility can be referred to as offloading, e.g., WiFi offloading, in which at least some mobile devices 124, are serviced via the non-3GPP access points 180, allowing subscribers to access subscribed services of the mobile service provider, preferable in a seamless manner.

The example communications network 100 includes an offload manager 186. The offload manager 186 can located within a data center housing a mobility packet core of the 3GPP mobile service. Alternatively or in addition, the offload manager 186 can be located virtually anywhere, e.g., in the cloud, and accessed as a resource or service to coordinate offload traffic, or mobility between 3GPP access points 120 and non-3GPP access points 180. For example, the offload manager 186 can be adapted to implement one or more rules and/or logic to permit and/or deny offload requests according to network utilization. In particular, if utilization of the radios of the 3GPP access point 120 exceed a predetermined threshold, the offload manager 186 may allow all offload requests. Alternatively, the offload manager 186 may be configured to allow a percentage or fraction of requests. In at least some embodiments, the percentage or fraction of requests allowed and/or denied can depend upon the utilization of the radio of the 3GPP access point 120.

Thus, if utilization is below a first threshold, no offload requests are permitted, as the radios of the 3GPP access point have sufficient resources to service the subscribers. However, if the utilization exceeds the first threshold, a first percentage of offload requests can be permitted, while the balance of offload request are denied, i.e., being served by the 3GPP access point instead. If the utilization exceeds a second threshold, a second percentage of offload requests can be permitted or denied, as the case may be. In at least some embodiments the percentage permitted and/or denied can be determined according to a function of the utilization.

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets or phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
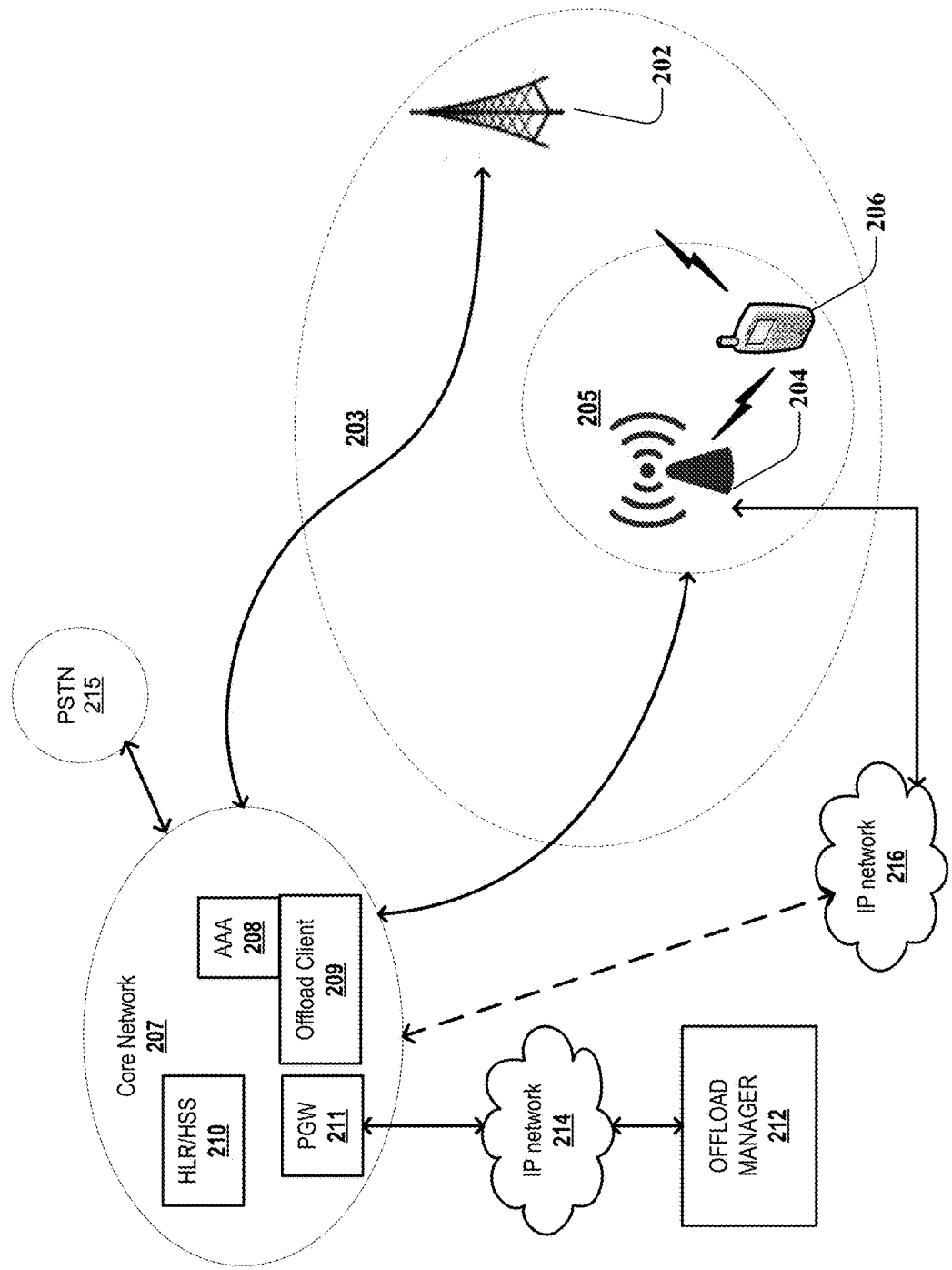
FIG. 2A is a block diagram illustrating an example, non-limiting embodiment of a wireless local area network offload system functioning within the communication network of FIG. 1 in accordance with various aspects described herein.

FIG. 2A is a block diagram illustrating an example, non-limiting embodiment of a wireless local area network offload system 200 that may function within the communication network 100 of FIG. 1 in accordance with various aspects described herein. The example system 200 includes a 3GPP cell radio 202 of a radio access network providing 3GPP service in a corresponding 3GPP wireless coverage area 203. The example refers to a 3GPP cell radio 202 as an example, however, it is understood that other non-3GPP radios may be applied, the radios operating within a managed frequency spectra, e.g., of a finite expanse as might be obtained by license, grant or the like. A non-3GPP access point 204, e.g., WiFi access point, provides non-3GPP service, in a corresponding non-3GPP wireless coverage area 205. The non-3GPP access point 204 may include any wireless access point, e.g., a radio, that operates according to a different frequency access plan as contrasted to the 3GPP cell radio 202. For example, the non-3GPP access point 204 operates within an unlicensed, free, public, shared or otherwise available frequency spectra.

According to the illustrative example, the 3GPP wireless coverage area 203 overlaps at least a portion of the non-3GPP wireless coverage area 205. It is envisioned that the 3GPP wireless coverage area 203 may be larger than the non-3GPP wireless coverage 205, however, in at least some scenarios, this may not be the case. For example, the 3GPP wireless coverage area 203 may result from a micro cell, pico cell or femto cell radio 202 offering wireless coverage within a relatively small or limited area 203. In such a scenario, it is conceivable that the non-3GPP wireless coverage area 205 may encompass some or all of the 3GPP wireless coverage area 203. A mobile device 206 is shown at a location residing within the 3GPP wireless coverage area 203 and the non-3GPP wireless coverage area 205, such that the mobile device 206 can communicate with the non-3GPP access point 204, the 3GPP cell radio 202, or both.

The 3GPP cell radio 202 is in communication with a mobile operator network, e.g., a core network 207, that provides services to the mobile device 206 of a mobile services subscriber. The core network 207 can include, among other features, equipment providing a subscriber database to identify subscribers, subscriber equipment and/or other subscription information, such as subscribed services, levels of services and the like. The core network 207 may also include an authentication function to manage wireless access and/or subscribed service access of the subscriber equipment, e.g., identifying subscribers and/or subscriber equipment in cooperation with the subscriber database and granting or denying access, as the case may be. By way of non-limiting example, the core network 207 can facilitate one or more of directing telephone calls over a public switched telephone network (PSTN) 215, provide mobile access to an Internet protocol (IP) network, 214, manage mobility of the mobile device 206, e.g., coordinating handoffs to other radio access networks and/or handoffs to WLANs 204, including usage metering, billing, authentication, authorization, and so on.

The example core network 207 includes an authentication, authorization and accounting (AAA) server 208 that provides access, control and security for the mobile network, by supporting a set of protocols that mediate and track user access by authenticating, authorizing and/or accounting for mobile user activities. The example core network 207 also includes a home location register and/or a home subscriber server (HLR/HSS) 210, or similar module that provides access to subscriber information or records, e.g., a database, that contain user-related and/or subscriber-related information. The HLR/HSS 210 may support functions in mobility management, call and session setup, user authentication and/or access authorization, e.g., in cooperation with the AAA server 208.

The core network 207 is typically in communication with other networks, such as the IP network 214, e.g., through a packet data network gateway (PGW) 211 that serves as a point of interconnect between the core network 207 and one or more external IP networks 214. In the illustrative embodiments, the core network 297 includes an offload client 209 in communication with the AAA server 208. The offload client 209 is also in communication with an offload manager 212, e.g., a server, via the IP network 214. In at least some applications, the offload manager 212 may service more than one core networks 207 of a common mobile service provider and/or of different mobile service providers. Alternatively or in addition, the offload manager 212 may be collocated with the core network 207, e.g., at a common data center. Although the example configuration includes an offload manager 212 and an offload client 209, it is envisioned that the offload manager can be implemented without the client, e.g., when collocated with the core network 207. It is further envisioned that the offload client manager 212 and/or offload client 209 may be implemented within one or more network elements of the core network, e.g., within the AAA server 208 and/or the HLR/HSS server 210.

In operation, the mobile device 206 may discover the non-3GPP access point 204 when within the non-3GPP wireless coverage area 205 and attempt to connect to it wirelessly. The non-3GPP access point 204 may identify the mobile device, e.g., according to a unique identifier identifying a mobile device and/or subscriber, such as an international mobile subscriber identity (IMSI) value obtained from the mobile device 206. Having obtained the mobile device and/or subscriber identity, the non-3GPP access point 204 may identify an associated mobile service provider, and forward to the appropriate mobile service provider, an indication that the identified subscriber has made an access request. The mobile service provider may respond to the access request, in turn, authorizing or denying the request, as the case may be. A response may include a credential or credentials, such as a username and/or password that when provided to the non-3GPP access point 204, allow the mobile device 206 to log in or otherwise attach to the non-3GPP access point 204. Once logged in or attached, the mobile device 206 can access one or more IP networks 216, and/or one or more wireless services, such as WiFi voice calls, SMS, streaming audio, streaming video, data transfer, and the like.

Alternatively or in addition, the non-3GPP access point 204 may not identify the mobile device 206, per se, but instead, obtain the unique identifier from the mobile device 206, such as the IMSI value, and forward it to one or more mobile service providers. The mobile service providers may use the unique identifier to identify the mobile device and/or subscriber as a subscriber of mobile services. Likewise, the mobile service provider may respond to the access request, in turn, authorizing or denying the request, as the case may be. Once again, the response may include a credential or credentials, such as a username and/or password of the non-3GPP access point 204 that allow the mobile device 206 to log in or otherwise attach to the non-3GPP access point 204.

In at least some embodiments, the offload manager 212 can be adapted to implement a rule and/or logic that is applied responsive to a request to access the non-3GPP access point 204. Access may be granted or denied according to the application of rule and/or logic. A resulting grant or denial of access may be communicated from the offload manager 212 to the offload client 209 at the core network 207. The offload client 209, in turn, may coordinate with the AAA server 208 to provide authorization credentials to the non-3GPP access point 204 responsive to a grant of access, or to prevent a transfer of authorization credentials to the non-3GPP access point 204 responsive to a denial of access. The non-3GPP access point 204 complies accordingly to grant or deny access to the mobile device 206, as the case may be.

In some embodiments, any request to allow a mobile device 206 to attach to a non-3GPP wireless access point 204 may be denied unless utilization of a nearby 3GPP radio 202 has met and/or exceeded a utilization threshold. Likewise, any request to allow the mobile device 206 to attach to the non-3GPP hotspot 204 may not be denied, or otherwise permitted or granted, if utilization of the nearby 3GPP radio 202 has not met and/or exceeded the utilization threshold. Namely, if a utilization of the nearby 3GPP radio 202 is not above some threshold value, a request for attachment of the mobile device 206 to the non-3GPP access point 204 may be denied.

For example, the offload manager 212 accesses utilization data from the nearby 3GPP radio 202, and applies the rule and/or policy to grand or deny access according to the utilization. Access may be denied if utilization of the nearby 3GPP radio 202 is below a threshold value, such that the mobile device 206 accesses subscribed services via the 3GPP radio 202 and not via the non-3GPP access point 204. Likewise, access may be granted if utilization of the nearby 3GPP radio 202 is above the threshold value. Thus, the mobile device 206 would be enabled to access an IP network 216, including subscribed services, via the non-3GPP access point 204.

In at least some embodiments, a measure of utilization is based upon resource blocks. For example, the utilization metric can be based on a number of allocated or used resource blocks, a number of unallocated or unused resource blocks, a percentage of available resource blocks that are utilized, a percentage of available resource blocks that are unutilized or otherwise available, and so on. Alternatively or in addition, the utilization metric can be based upon one or more of an available bandwidth, utilized bandwidth, percentage of utilized bandwidth and/or percentage of available bandwidth, a portion of available processing capacity, a portion of available memory, a portion of available power in any combination.

It is worth noting here that although the examples provided herein discuss managing offloading of mobile devices 206, it is understood that the disclosed systems, processes and/or supporting software can provide offloading services to any wireless device, including stationary devices. For example, offloading services may be applied to machine to machine type communications, e.g., according to an Internet of things (IoT) scenario. Alternatively or in addition, it is envisioned that one or more of the 3GPP radio 202 and/or the non-3GPP access point 204 may be mobile providing offloading services to devices that may be stationary or mobile. Consider a non-3GPP access point within a vehicle, such as a bus or a train, providing offloading services to subscriber equipment, e.g., commuters.

Figure 2B:
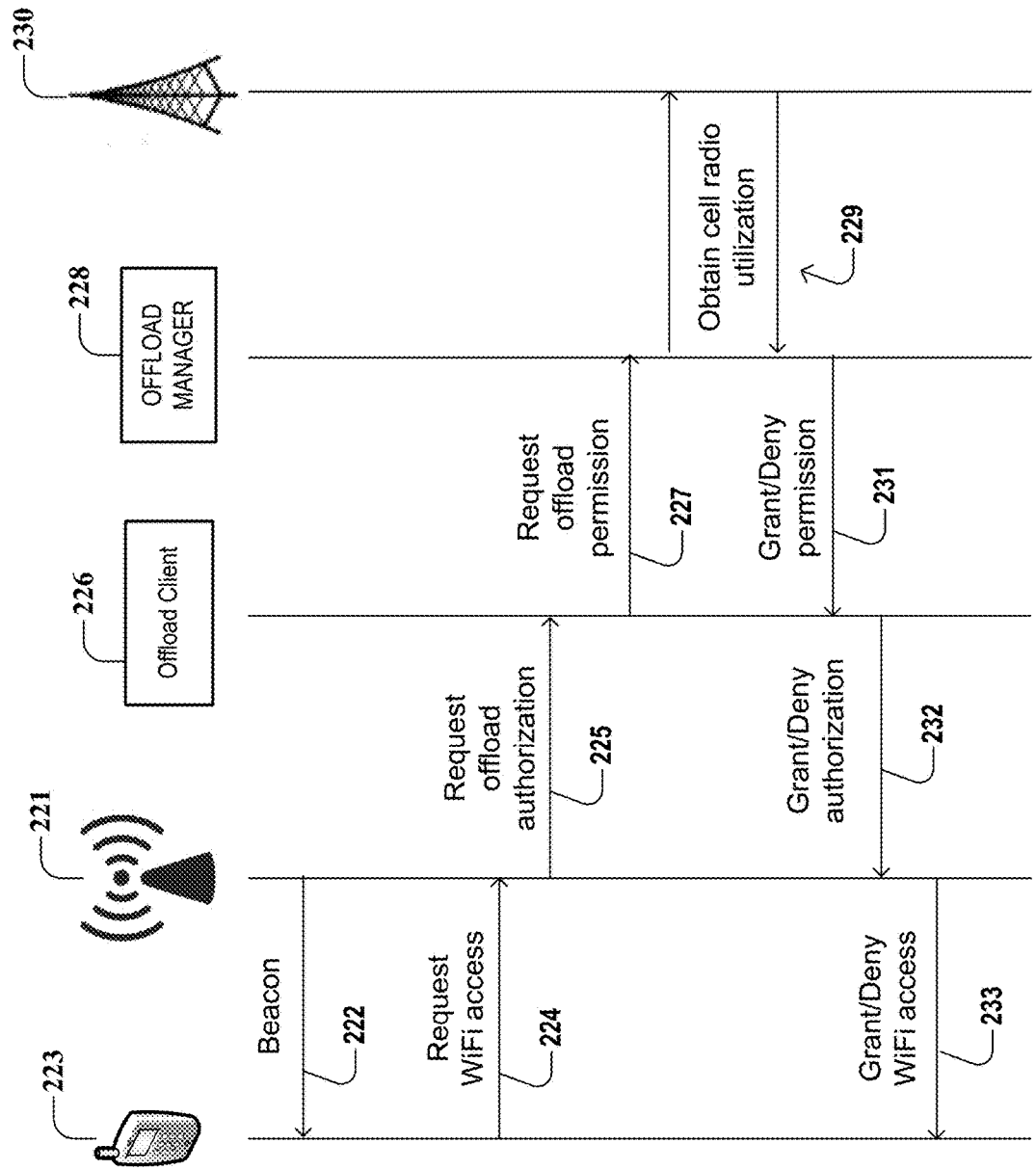
FIG. 2B is a schematic diagram illustrating an example, non-limiting embodiment of a message exchange within a wireless local area network offload system of FIG. 2A, functioning within the communication network of FIG. 1 in accordance with various aspects described herein.

FIG. 2B is a schematic diagram illustrating an example, non-limiting embodiment of a message exchange 220 within a wireless local area network offload system of FIG. 2A, functioning within the communication network of FIG. 1 in accordance with various aspects described herein. A non-3GPP wireless access point 221 transmits a signal, such as a beacon 222 signal that is detectable by a mobile device 223 within a wireless coverage area of the access point 221. For example, an IEEE 802.11 wireless access point 221 may transmit a signal 222 including beacon frames transmitted periodically. The beacon frames serve to announce a presence of a WLAN, provide synchronization information and the like. The mobile device 223 detects the beacon 222 and may generate a reply signal 224 that includes a request indicating that the mobile device 223 requests access to the WLAN.

In some embodiments, e.g., in which the mobile device 223 may have previously attached to wireless access point 221, or have been pre-provisioned with access credentials, the wireless access point 221 may permit the mobile device 223 to attach. However, in at least some embodiments, attachment is conditioned upon logic, policies and/or rules of a mobile service provider. In such instances, the wireless access point 221 generates a message and provides or otherwise forwards the request for offload authorization message 225 to an offload client 226. The offload client 226 may serve as a gatekeeper of sorts, effectively granting or denying access to the wireless access point 221.

According to the illustrative embodiment, which includes the offload client 226 and an offload manager 228, the offload client generates a message and provides or otherwise forwards the request for offload permission message 227 to the offload manager 228. It is envisioned that in at least some embodiments, e.g., in which the offload manager 228 is collocated with or otherwise integrated with a core network of the mobile service provider, there may not be separate offload client 226 and offload manager. Rather, the offload manager 228 may receive the request for offload authorization 225 and grant or deny access, as the case may be.

The offload manager 228 is adapted to implement the logic, policies and/or rules to determine whether the mobile device 223 will be granted access to the wireless access point 221. In some embodiments, the logic, policies and/or rules are implemented responsive to the request for offload authorization 225 and/or request for offload permission 227. For example, the logic, policies and/or rules may be dependent upon current conditions, e.g., determined in real-time or near real time. Conditions can include, without limitation, a condition of a resource, such as a nearby 3GPP cellular radio 230, a nearby radio access network, e.g., including the 3GPP cellular radio 230, a backhaul network interconnecting the 3GPP cellular radio 230 or radio access network and a mobile service provider core network 207 (FIG. 2A), and the like. The condition can include, without limitation, a utilization of the resource, a maintenance status of the resource, an available capacity of the resource, and the like. In at least some embodiments, the condition is based upon a current condition. Alternatively or in addition, the condition is based a prior condition and/or a predicted condition, which may also be based at least in part upon a prior condition.

In at least some embodiments, the condition can include ancillary information, such as a schedule identifying a scheduled event, such as a rush hour commute, a sporting event, a time of day, a day of the week, a season, a natural disaster or other emergency event as may be discovered by broadcasts of an emergency broadcast service, and so on.

Alternatively or in addition, the logic, policies and/or rule may be pre-determined, such that the request for offload authorization 225 and/or request for offload permission can be responded to based upon a pre-determined result of the logic, policies and/or rules. For example, the logic, policies and/or rules can be applied according to an update schedule, e.g., every few minutes, tens of minutes, hours, daily, to obtain a predetermined result according to the update schedule. The update schedule may vary according to one or more of time of day, day of week, location of one or more of the non-3GPP wireless access point 221, the 3GPP radio 230, and/or scheduled events, e.g., sporting event, traffic conditions, etc., in a vicinity of one or more of the access point 221 or the radio 230. For example, the update schedule may be relatively short, e.g., on the order of a few minutes or less, during peak usage times, or busy hours. Likewise, the update schedule may be relaxed, e.g., applied tens of minutes, hourly, or even less frequently during relatively low usage times.

In at least some events, the update schedule according to which pre-determined results of the logic, policies and/or rules are applied, is based at least in part on an event. For example, a monitored condition of the 3GPP radio 230, e.g., its utilization or bandwidth, may be monitored. According to the illustrative example, the offload manager 228 obtains condition of the 3GPP radio from an external source. For example, the offload manager 228 may query the 3GPP radio and receive query results indicating the applicable condition according to a query message exchange 229. Alternatively or in addition, the offload manager 228 may obtain condition information of the 3GPP radio from a source other than the radio 230 itself. Sources may include operation and/or maintenance (O&M) system of the mobile service provider, e.g., an O&M server at the core network 207 (FIG. 2A). Alternative or in addition, sources of 3GPP radio condition may be obtained from one or more applications resident on mobile devices 223. The applications may monitor signal strengths, prior successful and/or unsuccessful attachments to the 3GPP radio 230, channels, bandwidths, applications, QoS, and the like. Information from such mobile applications may obtained by the offload manager 228 directly from the mobile device 223 requesting access, other mobile devices, and/or a third party service that collects condition information from the mobile applications and provides results in a form of a report and/or a response to a query about a particular 3GPP radio 230.

The offload manager 228 may compare the monitored condition, e.g., utilization, to a threshold value, to obtain a first pre-determined result for utilization below the threshold value. The first pre-determined result can be applied by the offload manager 228 to determine a response to any request for offload authorization 225 and/or request for offload permission 227. Accordingly, any request 225, 227 receive can be responded to according to the pre-determined result. In at least some embodiments, the monitored conditions are determined according to a per-3GPP radio 230 basis, such that different pre-determined results may be obtained for different 3GPP radios. The offload manager 228 identifies the applicable 3GPP radio 230 as a nearby 3GPP radio 230 to the mobile device 223 and grants or denies the mobile device 223 access to the non-3GPP wireless access point 221, as the case may be.

Responsive to the monitored condition exceeding the threshold value for one or more of the monitored 3GPP radios 230, a second pre-determined result may be obtained according to an application of the logic, policies and/or rules by the offload manager 228. Once again, the offload manager 228 identifies the applicable 3GPP radio 230 as a nearby 3GPP radio 230 to the mobile device 223 and grants or denies the mobile device 223 access to the non-3GPP wireless access point 221, as the case may be.

The offload manager 228 provides a signal 231 to the offload client 226 identifying a grant or denial of permission for offloading. The offload client 226 may forward an indication 232 of the grand or denial to the non-3GPP wireless access point 221. The access point 221, in turn, proceeds to grant or deny the offload request of the mobile device 223, as the case may be. In some embodiments, the offload client 226 works in cooperation with an authorization and/or authentication server or module, e.g., of a core network of the mobile service provider. In such instances, the authorization and/or authentication server or module may provide the appropriate credentials to the non-3GPP wireless access point 221, responsive to the offload request being granted, to effectively grant access 233, allowing the mobile device 223 to access to the non-3GPP wireless access point 221. In at least some embodiments, access can include access to subscribed services generally available via the 3GPP radio 230. Conversely, the authorization and/or authentication server or module may refrain from submitting credentials to permit access, or submit other credentials inconsistent with those that would otherwise result in a grant of offload access. Consequently, the requesting mobile device 223 would be denied offload to the non-3GPP wireless access point 221.

Figure 2C:
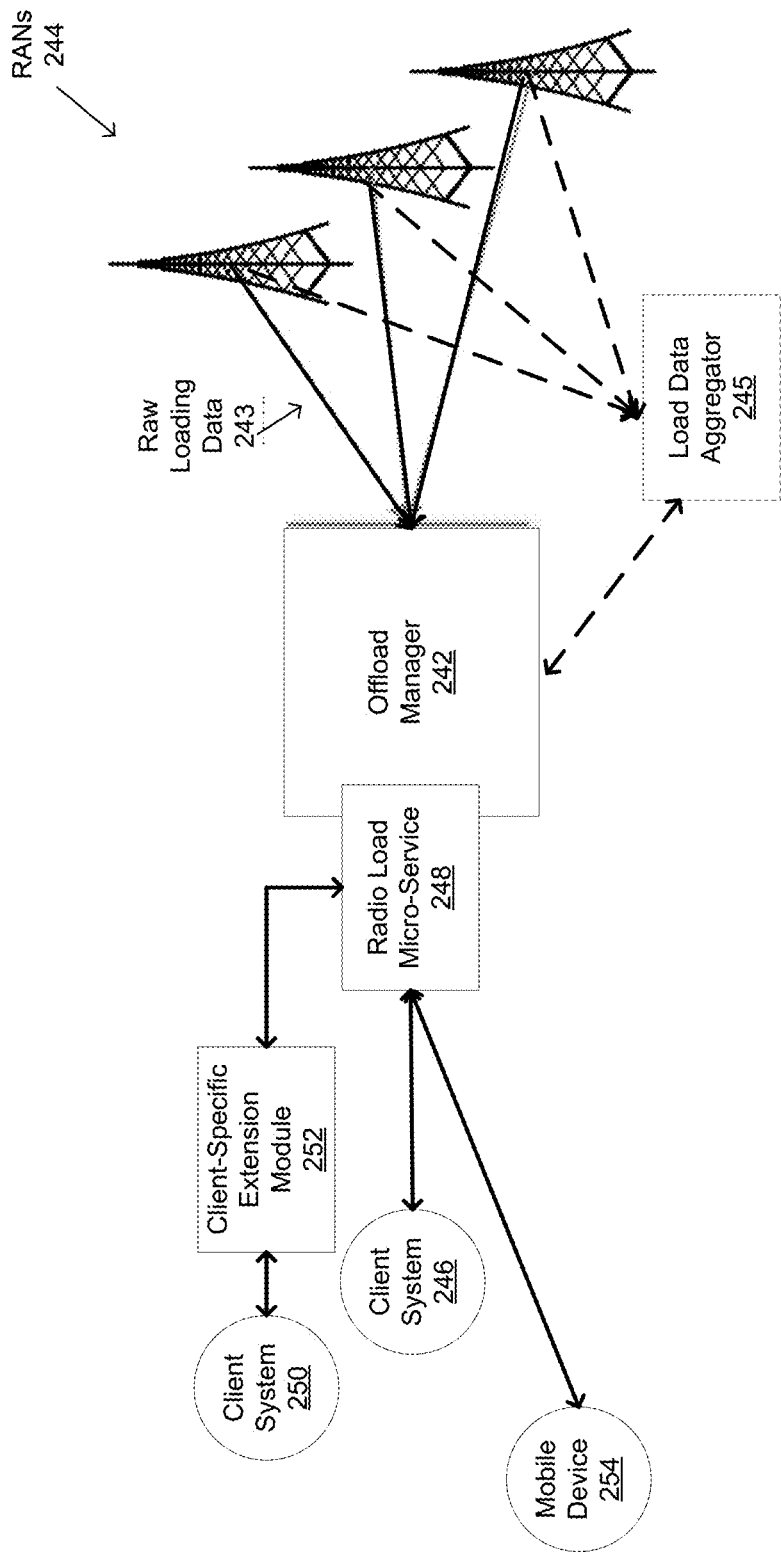
FIG. 2C is a block diagram illustrating an example, non-limiting embodiment of a radio load service supporting a wireless local area network offload system of FIG. 2A, and functioning within the communication network of FIG. 1, in accordance with various aspects described herein.

FIG. 2C is a block diagram illustrating an example, non-limiting embodiment of a radio load monitoring system 240 that may be used to support a wireless local area network offload system 200 of FIG. 2A, and operate functioning within the communication network 100 of FIG. 1, in accordance with various aspects described herein. According to the illustrative embodiment, an offload manager 242 receives loading data 243 for one or more 3GPP radio access networks (RANs) 244. The loading data 243 may include radio loading data, e.g., raw loading data, reported by the 3GPP RANs 244. Alternatively or in addition, the loading data 243 may include compiled radio loading data from loading data aggregator 245 (shown in phantom). Alternatively or in addition, the offload manager 242 may receive radio loading data from a radio load service.

According to the illustrative example, a radio load microservice 248 collects radio loading data from one or more of a client system 246, 250 and/or a mobile device 254. For example, a software agent may be pre-installed on mobile devices 254 by handset manufacturers and/or network operators. The software agent is adapted to gather, store and forward metrics that may include diagnostic measurements to the manufacturer and/or network operator. The metrics can be forwarded periodically, e.g., to service platform 248, such as a Carrier IQ Mobile Service Intelligence Platform system, which may be adapted to feed the information into the network operator's network performance monitoring and diagnostic tools, e.g., the offload manager 242.

In at least some embodiments, the system 240 may include a client specific extension module 252 that may be adapted to implement client-specific functionality. For example, the client-specific extension module 252 may be adapted to collect a subset of diagnostic measurements reported by a software agent operating on the client system 250. Alternatively or in addition, the client-specific extension module 252 may be adapted to collect the diagnostic measurements according to a schedule determined by the mobile network operator. In at least some embodiments, the client-specific extension module 252 may be adapted to process diagnostic measurements obtained from the software agent to obtain processed radio loading data. The processed radio loading data may be forwarded to the offload manager, e.g., according to the radio load microservice 248. It is envisioned that functionality supporting the offload client manger 242 can be implemented one or more of the mobile device 254, the client systems 246, 259, the client-specific extension module 252 and/or the radio load micro-service 248. The functionality may include a distributed functionality distributed among more than one of the mobile device 254, the client systems 246, 259, the client-specific extension module 252 and/or the radio load micro-service 248.

Figure 2D:
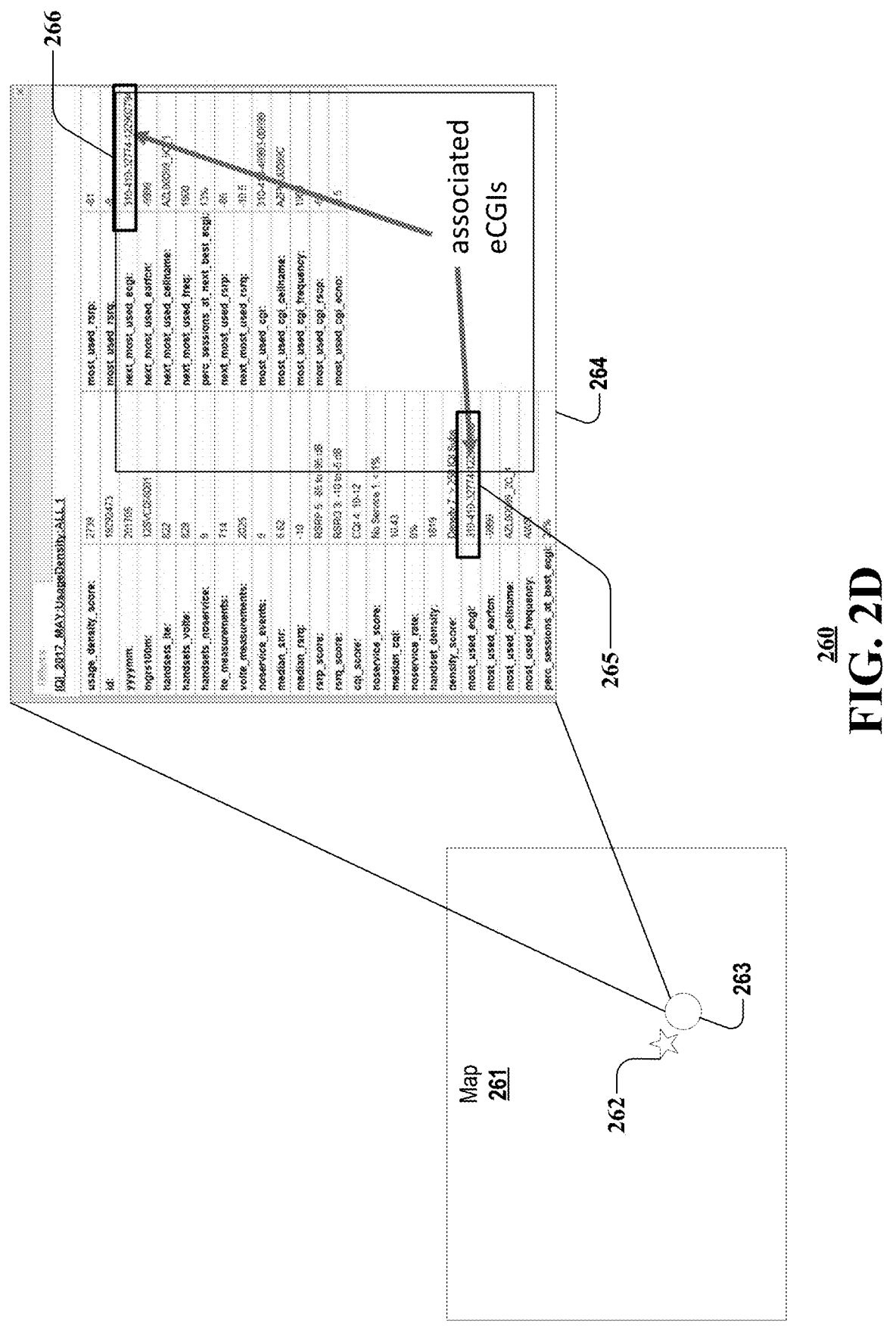

FIG. 2D is a schematic diagram illustrating an example, non-limiting embodiment of a map resource 260 that supports a wireless local area network offload system 200 functioning within the communication network 100 of FIG. 1 in accordance with various aspects described herein. The map resource 260 may include a map 261 of a location or venue, e.g., an airport, a shopping mall, a city block or blocks. The map 261 includes a location 262 associated with a non-3GPP wireless access point 263. The map 261 may be determined beforehand according to mobile network plans, e.g., those including rollouts of non-3GPP access points 263, site surveys as may be obtained periodically by O&M personnel, reports from other service providers, e.g., non-3GPP service providers, reports of prior connections to and/or handoffs to the non-3GPP access points 263 as may be obtained from an offload manager 212, 228 (FIGS. 2A and 2B), and the like.

The map resource 260 may include a non-3GPP-3GPP radio association record 264. The association record 264 may be generated and/or maintained by a metrics service platform 248 (FIG. 2C), such as a Carrier IQ Mobile Service Intelligence Platform system. Alternatively or in addition, the association record 264 may be generated and/or maintained by the offload manager 242. The association record 264 may be updated periodically or continuously as metric data is received, e.g., from one or more of the non-3GPP wireless access point 204, 221, 263, the mobile device 206, 223, 254 the 3GPP radio 202, 230, 244 (FIGS. 2A, 2B and 2C).

According to the illustrative example, the association record 264 may include 3GPP radio identifiers 265, 266 that identify one or more nearby 3GPP radios 202, 230, 244. According to the illustrative association record, a first radio identifier includes an E-UTRAN cell global identifier (eCGI) 265 of a first nearby 3GPP radio, and a second eCGI 266 of a second nearby 3GPP radio. By their inclusion in the association record 264, both nearby 3GPP radios are associated with the non-3GPP wireless access point 263 by their eCGIs 265, 266.

In at least some embodiments, additional metrics, such as a number of prior handoffs, a handoff success rate, and the like can be included in the association record 264. According to the example association record 264, the first eCGI 265 associated with the non-3GPP wireless access point 263 is identified as a "most used" eCGI for the access point 263. Likewise, the second eCGI 266 associated with the non-3GPP wireless access point 263 is identified as a "next most used" eCGI for the access point 263. To the extent more eCGIs are associated with the access point 263, they may be ordered in a similar manner. Such ordering information as it relates to the eCGIs 265, 266 may be taken into consideration by the network operator, e.g., by the offload manager 212, 228, 242 (FIGS. 2A, 2B and 2C). For example, the logic, policies and/or rules applied by the offload manager 212, 228, 242 may consider radio resource utilization for the 3GPP radios 202, 230, 244 (FIGS. 2A, 2B and 2C) according to a ranking of the 3GPP radios 202, 230, 244.

Consider a mobile device that discovers a non-3GPP wireless access point and submits a request attachment to the non-3GPP wireless access point. The mobile device may or may not already be attached to and/or served by one or more of the nearby 3GPP radios. Regardless, an offload manager receiving the request identifies one or more nearby 3GPP radios, e.g., according to the association record 264. The offload manager next determines a condition(s) of the one or more nearby 3GPP radios, e.g., according to radio loading metrics obtained from the radio load micro service 248 and/or directly from the identified 3GPP radios 244 (FIG. 2C). The offload manager applies the logic, policies and/or rules for at least one of the one or more nearby 3GPP radios according to the obtained metrics to obtain a permission or denial response to the request.

The offload manager forwards or otherwise provides the permission and/or denial response, which results in a permission or denial of non-3GPP wireless access point access to the requesting mobile device, as the case may be. In some embodiments, the offload manager submits the response to an offload client 209 (FIG. 2A), which may provide or prevent authentication and/or authorization according to the AAA server 208. For instances when authentication and/or authorization is restricted, the core network 207 may restrict, inhibit or otherwise prevent authentication and/or authorization of the mobile device 206 to the non-3GPP wireless access point 204, such that the wireless device 206 is prevented from attaching to the non-3GPP wireless access point 204.

In at least some embodiments, the offload manager retains a record of mobile devices that have been denied requests to offload to non-3GPP wireless access points. The retained records can be used to identify subsequent requests and to deny such subsequent requests in a consistent manner to prevent mobile devices that were denied from obtaining offload permission to subsequent requests. It is understood that in at least some embodiments, any application of consistent denials may be provided only during a limited time period, e.g., for requests received within the same few minutes, within the same hour, or number of hours, within the same day, and so on.

In at least some embodiments an identity of an offload requesting mobile device is determined and compared to prior denied devices before identifying a nearby 3GPP radio, and/or before consulting a condition of an identified nearby 3GPP radio and/or before applying any logic, policies and/or rules that may depend upon the condition of any nearby 3GPP radios.

Figure 2E:
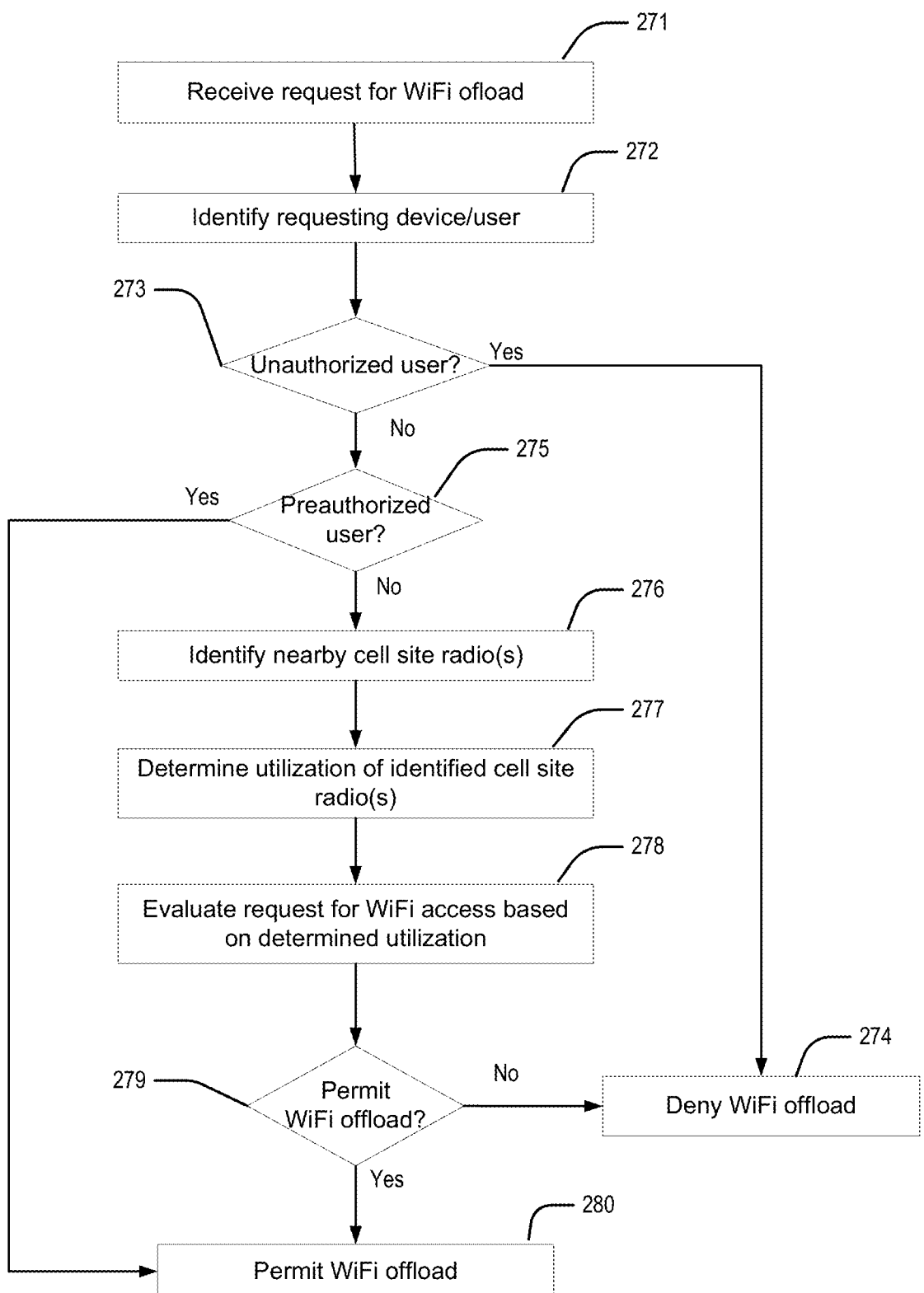
FIG. 2E depicts an illustrative embodiment of a wireless local area network offload control process in accordance with various aspects described herein.

FIG. 2E depicts an illustrative embodiment of a wireless local area network offload control process 270 in accordance with various aspects described herein. The process 270 receives a request for non-3GPP, offload at 271. The request may be received from a non-3GPP wireless access point, responsive to the access point having received a request for access by a requesting mobile device of a subscriber of a mobile cellular service. In some embodiments, the request includes an identity of the non-3GPP wireless access point, such as an access point name. Alternatively or in addition, the request may include an identity of the requesting mobile device, such as an IMSI value and/or other substantially unique identifying reference to the mobile device.

An identity of the requesting mobile device and/or mobile subscriber is made at 272. The identity of the mobile device may be obtained, for example, by the IMSI value provided with the offload request received from the non-3GPP wireless access point.

A determination is made at 273 as to whether the identified mobile device and/or subscriber is associated with an unauthorized user. In some embodiments, a so-called "blacklist" is maintained or otherwise accessed by equipment of the mobile service provider, such as the AAA server and/or the offload manager.

To the extent it is determined at 273 that the identified mobile device and/or subscriber is associated with an unauthorized user, the identified mobile device and/or subscriber is denied offload access to the non-3GPP wireless access point at 274. For example, to the extent it is determined, e.g., by association of the requesting mobile device IMSI value with a corresponding entry within the blacklist, an immediate denial of offload may be determined. In at least some embodiments, a denial by association with the blacklist can be handled without further evaluation, including without further evaluation by the offload manager based on conditions and/or utilization of any nearby cellular or 3GPP radios.

In at least some embodiments, an unauthorized user may include an otherwise valid user or subscriber that happened to have been previously denied an offload request to the reporting non-3GPP wireless access point within a predetermined period of time. For example an offload manager may track the identity of the requesting mobile device or subscriber, e.g., according to the IMSI value in association with any prior denials of the same device and/or subscriber. In at least some embodiments, a time of the prior denial and/or a time difference between a current request and a prior denial is also recorded or otherwise determined. In operation, an IMSI value of the requesting mobile device can be compared with a record of IMSI values previously denied to determine if the IMSI value was previously denied. To the extent it was denied access to the non-3GPP wireless access point, a further determination may be made to evaluate a time difference between the current request and the prior denial. To the extent the time difference is below a predetermine threshold delay value, offload is denied at 274.

In other embodiments, requesting devices can be denied in a consistent manner without necessarily retaining any record of identities of previously denied devices and/or subscribers. By way of example, the unique identifier of the requesting mobile device or subscriber, e.g., the IMSI value can be mapped algorithmically to a predetermined range. A utilization threshold can also be mapped to the predetermined range and a determination made as to whether the mapped IMSI value is above or below the mapped threshold value. A corresponding grant or denial of the offload request depends on the comparison of these values.

In a particular example, IMSI values of requesting mobile device are hashed to a range between 0-1 or 0-99, e.g., to correspond to a percentage value. The hashing algorithm can ensure a relatively uniform distribution of mapped IMSI values over the predetermined range. Beneficially, the hashing algorithm ensures that a fixed IMSI value will always hash to the same value, thereby ensuring repeatability. A threshold value, in this instance, a percentage of requests that would granted and/or denied is identified within the predetermined range. To the extent the hashed IMSI value falls above or below the threshold, a grant or denial is generated.

For example, if a request percentage is 70% granted, or 30% denied, the hashed IMSI value between 0-99 can be compared to the denial percentage, e.g., 70 and if the hashed value is below 70, the request is granted. To the extent that the hashed value is above 70, i.e., between 70-99, the request may be denied. It is understood that in at least some embodiments, the percentage of request granted or denied may depend upon a utilization threshold of the 3GPP radios. For example, if 3GPP radio utilization exceeds 80%, then a percentage, e.g., 80% of requests may be granted. If 3GPP utilization exceeds 90%, then a different percentage, e.g., 90% of request may be granted, and if utilization approaches 100%, then virtually all request may be granted, at least until utilization reduces to a lesser number. The grants or denials can be applied to requesting devices in a consistent manner according to the hashing algorithm. Likewise, if utilization is below some threshold value, e.g., 80%, then virtually all offload requests may be denied. Such denials are based upon a determination of there being sufficient 3GPP radio resources available to service all subscribers within the applicable coverage area, thereby avoiding any costs, e.g., data rates that might otherwise apply in an offload situation.

To the extent it is determined at 273 that identified mobile device and/or subscriber is not associated with an unauthorized user, a further determination is made at 275 as to whether the identified mobile device and/or subscriber is associated with a preauthorized user. For example, a determination may made at 273 as to whether the identified mobile device and/or subscriber is associated with an entry in a so-called "whitelist" maintained or otherwise accessed by equipment of the mobile service provider, such as the AAA server and/or the offload manager. The whitelist may include devices and/or subscribers that should not be denied non-3GPP offload under any circumstances. Such whitelist status may result from a device being associated with an O&M service, e.g., a test device, of the mobile cellular service provider. Alternatively or in addition, a whitelist status may be associate with a level of subscription. For example, a subscriber may pay a premium for the advantage of being offloaded to non-3GPP wireless cellular access points, when available.

To the extent it is determined at 275 that the identified mobile device and/or subscriber is associated with a preauthorized user, the identified mobile device and/or subscriber is permitted offload access to the non-3GPP wireless access point at 274 without requiring any further evaluation of status of nearby 3GPP radios.

To the extent it is determined at 275 that identified mobile device and/or subscriber is not associated with a preauthorized user, one or more nearby 3GPP radios are identified at 276. In some embodiments, the offload request received from the non-3GPP wireless access point includes an identifier of the access point, e.g., an access point name. An association of access point names to locations may be obtained or otherwise determined, e.g., based on reporting of locations, site surveys, prior requests and the like. Having determined an approximate location of the access point, e.g., a business name, residential address, geo-coordinates, and the like, the mobile service provider may determine nearby 3GPP radios based on coverage maps, e.g., including 3GPP coverage that encompasses the determined location of the access point.

Alternatively or in addition, associations are maintained, e.g., by the mobile cellular service provider, and/or by an offload managing entity, that associate nearby 3GPP radios with non-3GPP wireless access points without necessarily requiring any physical location information for the non-3GPP wireless access points. Examples include, without limitation, the non-3GPP-3GPP radio association record 264 (FIG. 2D).

A condition of one or more of the identified one or more nearby 3GPP radios is determined at 277. The condition can include any of the example conditions included herein or otherwise known to those skilled in the art as being indicative of a utilization and/or capacity of the 3GPP radio. For example, the condition can include a utilization of a data carrying capacity of the 3GPP radio. Without limitation, such a data carrying capacity may include a number of resource blocks utilized, and/or a percentage of resource blocks utilized by the 3GPP radio. Such measures of utilization may be obtained in real time or near real time, e.g., responsive to receipt of the offload request. Alternatively or in addition, such measures of utilization may be maintained and otherwise updated according to a schedule and/or according to events. In such instances, the maintained utilization records can be consulted at 277.

The request for non-3GPP offload is evaluated at 278 according to the condition of the at least one of the identified one or more nearby 3GPP radios. Evaluation can include, without limitation, application of logic, policies and/or rules according to the determined 3GPP radio condition. In at least some embodiments, the logic, policies and/or rules include determining a current utilization of a nearby 3GPP radio and comparing the utilization to a threshold utilization value. Offload may be permitted or denied responsive to the evaluation.

It is understood that in at least some embodiments, the evaluation at 278 may be substantially fixed, e.g., operating according to a fixed utilization threshold. Alternatively or in addition, the evaluation at 278 may vary. For example, an applied utilization threshold may vary depending upon variances in offloading costs, cost tradeoffs between offloading versus installing additional 3GPP radios, and the like.

A determination is made at 279 as to whether an offloading of the identified mobile device and/or subscriber to the non-3GPP wireless access point should be permitted. In some embodiment, the determination is based upon a comparison of the determined 3GPP radio condition, e.g., utilization, to one or more utilization thresholds. When utilization is below a threshold value, no offloading requests are granted, or only a first portion of offloading requests are granted, e.g., a relatively small percentage, e.g., 5%. Conversely, when utilization if the 3GPP radio is above a threshold value, offloading requests are granted. In some embodiments, all offloading requests are granted, while in other instances, only a portion of the offloading requests are granted, e.g., a percentage, such as 50% or 70%. It is understood that the percentage of offload requests granted may be determined according to a graded or sliding scale, in which a greater utilization value results in a greater percentage of offloading request being granted.

To the extent it is determined at 279 that offloading of the identified mobile device and/or subscriber is not permitted, the identified mobile device and/or subscriber is denied offload access to the non-3GPP wireless access point at 274.

To the extent it is determined at 279 that offloading of the identified mobile device and/or subscriber is permitted, the identified mobile device and/or subscriber is granted offload access to the non-3GPP wireless access point at 280.

The requested offload access may be granted and/or denied conditionally based on a current condition, e.g., a utilization, of a nearby 3GPP radio, resulting in a conditional access. In at least some embodiments, the conditional access may be based on an application of logic, policies and/or rules to the condition, e.g., the utilization, of the nearby 3GPP radio. For example, the conditional access may be granted or denied according to a utilization threshold determined responsive to an anticipated or estimated cost associated with offloaded non-3GPP traffic. Under a relatively low rate scenario, the offload threshold may be relatively low, such that more users are offloaded when compared to a scenario in which higher rates result in a relatively high threshold.

In some embodiments, the offload request may be permitted at 280 or denied at 274 according to a response to the request generated by the offload manager. A response may include an indication of whether the request is granted or denied. The response may be provided to an AAA server, or any other core network element or authentication server adapted to provide or facilitate provision of access information to the non-3GPP wireless access point. Alternatively or in addition, the response may be provided or otherwise forwarded to the non-3GPP wireless access terminal associated with the request.

In at least some embodiments, the techniques disclosed herein can be implemented without requiring any software updates or special functionality at one or more of the mobile device, the non-3GPP wireless access terminal, and/or the nearby 3GPP radio. It is understood that the conditional access techniques disclosed herein can be applied to or cooperate with other offload systems and/or software, such as Hotspot 2.0, Hotspot 2.0, also known as HS2, and Wi-Fi Certified Passpoint, an approach to public access Wi-Fi by the Wi-Fi Alliance.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 220, 240, 300 and process 270 presented in FIGS. 1, 2A, 2B, 2C, 2E, and 3. For example, virtualized communication network 300 can facilitate in whole or in part responding to a request for offloading subscriber equipment to a non-3GPP wireless access point based on an identity of the subscriber equipment and a utilization of a 3GPP radio providing coverage that overlaps a coverage area of the non-3GPP wireless access point. The response may permit a predetermined percentage of requesting subscriber devices to offload to the non-3GPP wireless access point based on the utilization of the 3GPP radio, while denying a balance of requesting subscriber devices from offloading.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
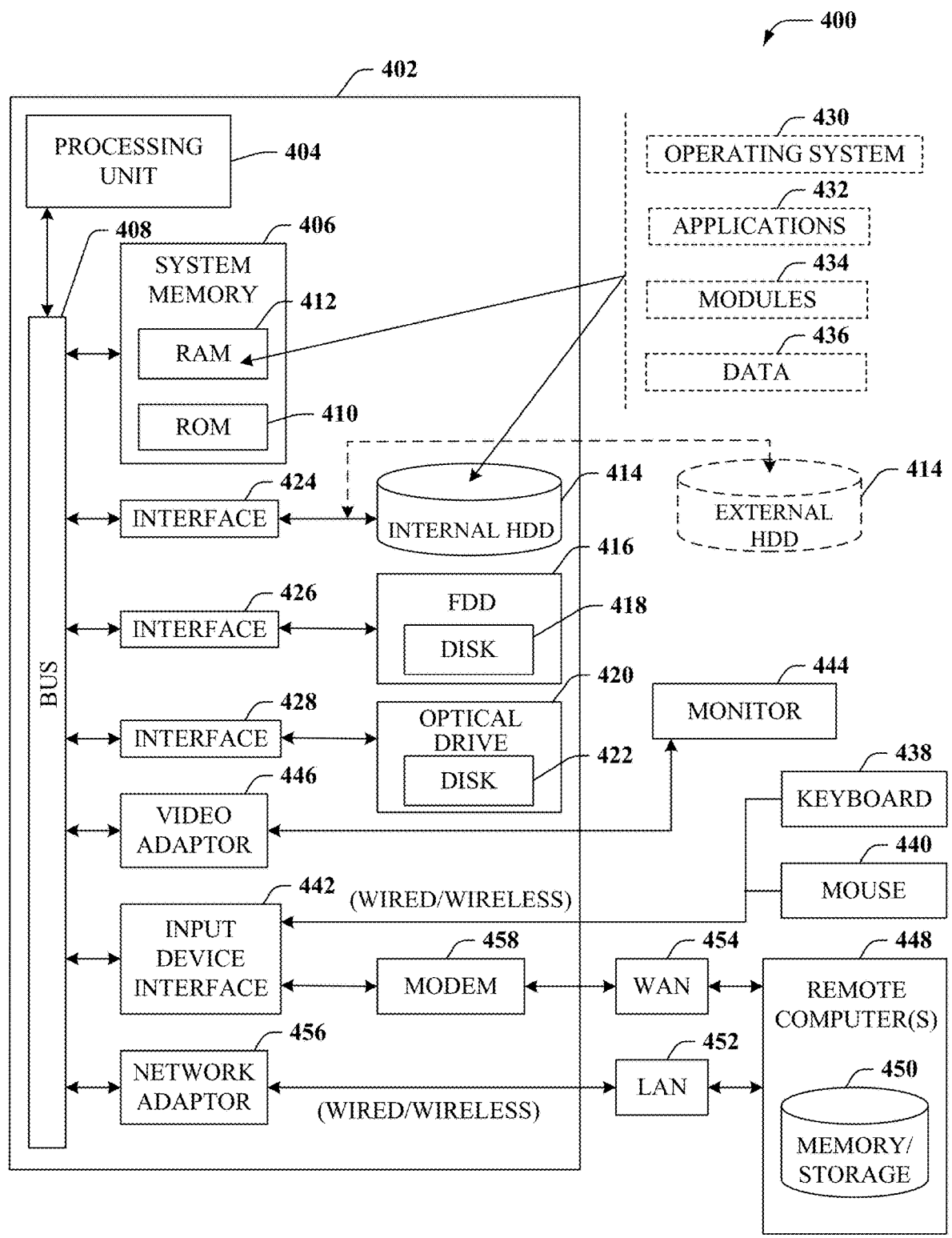
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part responding to a request for offloading subscriber equipment to a non-3GPP wireless access point based on an identity of the subscriber equipment and a utilization of a 3GPP radio providing coverage that overlaps a coverage area of the non-3GPP wireless access point. The response may permit a predetermined percentage of requesting subscriber devices to offload to the non-3GPP wireless access point based on the utilization of the 3GPP radio, while denying a balance of requesting subscriber devices from offloading.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
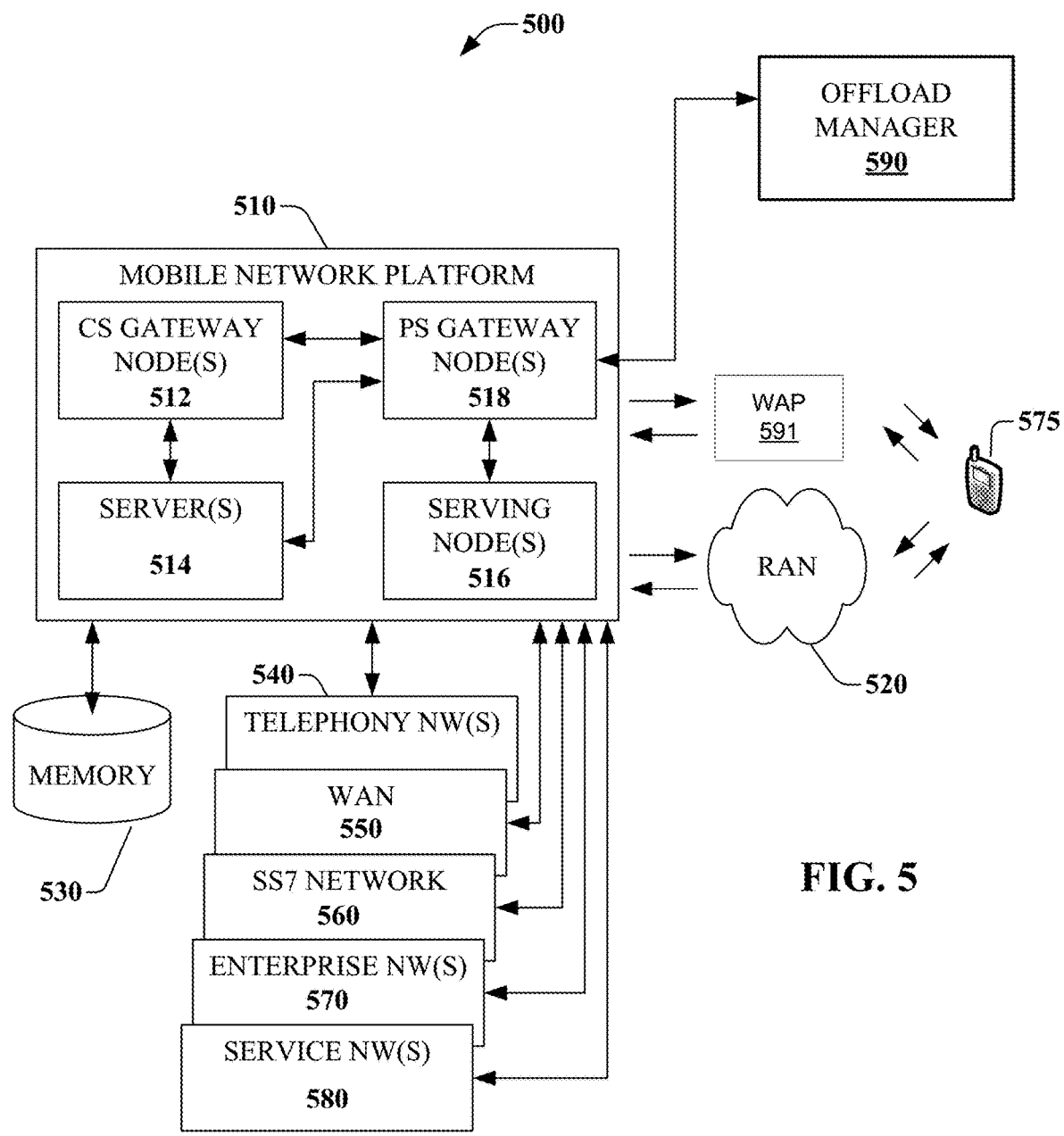
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part responding to a request for offloading subscriber equipment to a non-3GPP wireless access point based on an identity of the subscriber equipment and a utilization of a 3GPP radio providing coverage that overlaps a coverage area of the non-3GPP wireless access point. The response may permit a predetermined percentage of requesting subscriber devices to offload to the non-3GPP wireless access point based on the utilization of the 3GPP radio, while denying a balance of requesting subscriber devices from offloading. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
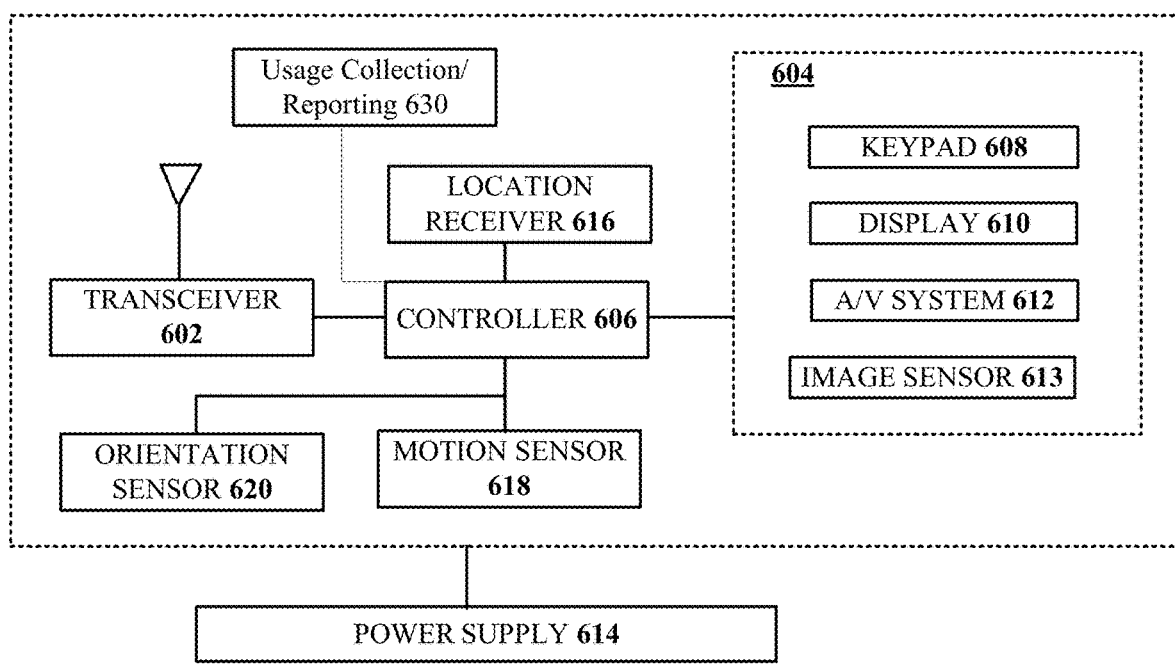
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part responding to a request for offloading subscriber equipment to a non-3GPP wireless access point based on an identity of the subscriber equipment and a utilization of a 3GPP radio providing coverage that overlaps a coverage area of the non-3GPP wireless access point. The response may permit a predetermined percentage of requesting subscriber devices to offload to the non-3GPP wireless access point based on the utilization of the 3GPP radio, while denying a balance of requesting subscriber devices from offloading.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        receiving a request to permit equipment of a subscriber of a mobile service provider that provides a subscribed service via a licensed frequency spectrum to access the subscribed service via a wireless access terminal according to an unlicensed frequency spectrum;
        identifying a radio, to obtain an identified radio, adapted to provide access to the subscribed service via the licensed frequency spectrum, wherein the wireless access terminal resides within a wireless coverage area of the identified radio;
        determining an identity of the equipment of the subscriber;
        mapping the identity of the equipment of the subscriber to a mapped value within a predetermined range;
        determining a utilization threshold of the identified radio;

mapping the utilization threshold to the predetermined range to obtain a mapped threshold;
comparing the mapped value to the mapped threshold to obtain a comparison result;
determining a current utilization of the identified radio; and
generating a response to the request according to the current utilization of the identified radio, the comparison result and the identity of the equipment of the subscriber, wherein access to the subscribed service via the wireless access terminal is granted conditionally according to the response to the request, resulting in conditional access.

2. The device of claim 1, wherein the operations further comprise:
determining the identity of the equipment is associated with one of a whitelist of equipment or a blacklist of equipment, wherein the white list of equipment is not to be denied access to the subscribed service via the wireless access terminal, wherein the blacklist of equipment is not to be permitted access to the subscribed service via the wireless access terminal.

3. The device of claim 2, wherein the operations further comprise:
overriding the conditional access responsive to the identity of the equipment of the subscriber being associated with the whitelist of equipment to permit access to the subscribed service via the wireless access terminal.

4. The device of claim 2, wherein the operations further comprise:
overriding the conditional access responsive to the identity of the equipment of the subscriber being associated with the blacklist of equipment to deny access to the subscribed service via the wireless access terminal.

5. The device of claim 1, wherein the request includes an International Mobile Subscriber Identity of the equipment of the subscriber.

6. The device of claim 1, wherein the utilization threshold comprises a threshold percentage, a portion of all requests to permit equipment of a plurality of subscribers of the mobile service provider to access the subscribed service via a wireless access terminal being evaluated according to the threshold percentage in a repeatable manner, such that a particular subscriber device of the equipment of the plurality of subscribers is denied access to the subscribed service via the wireless access terminal.

7. The device of claim 1, wherein the determining the utilization threshold of the identified radio is based on accessing maintained utilization records that are updated according to a schedule, an event, or a combination thereof.

8. The device of claim 1, wherein the mapping the identity comprises implementing a hash function that maps the identity of the equipment of the subscriber to the predetermined range being between 0 and 99.

9. The device of claim 1, wherein the mobile service provider provides access to the subscribed service via the licensed frequency spectrum according to a 3GPP protocol.

10. The device of claim 1, wherein the conditional access is managed via an authentication function of a core network of the mobile service provider.

11. A method, comprising:
receiving, by a processing system including a processor, a request to permit equipment of a subscriber of a mobile service provider that provides a subscribed service via a licensed frequency spectrum to access the subscribed service via a wireless access terminal according to an unlicensed frequency spectrum;
identifying, by the processing system, a radio, to obtain an identified radio, adapted to provide access to the subscribed service via the licensed frequency spectrum, wherein the wireless access terminal resides within a wireless coverage area of the identified radio;
determining, by the processing system, an identity of the equipment of the subscriber;
mapping, by the processing system, the identity of the equipment of the subscriber to a mapped value within a predetermined range;
determining, by the processing system, a utilization threshold of the identified radio;
mapping, by the processing system, the utilization threshold to the predetermined range to obtain a mapped threshold;
comparing, by the processing system, the mapped value to the mapped threshold to obtain a comparison result;
determining, by the processing system, a utilization of the identified radio; and
providing, by the processing system, a response to the request according to the utilization of the identified radio, the comparison result and the identity of the equipment of the subscriber, wherein access to the subscribed service via the wireless access terminal is conditional according to the response to the request, resulting in conditional access.

12. The method of claim 11, wherein the mapping the identity comprises implementing a hash function that maps the identity of the equipment of the subscriber to the predetermined range being between 0 and 99.

13. The method of claim 11, wherein the mobile service provider provides access to the subscribed service via the licensed frequency spectrum according to a 3GPP protocol.

14. The method of claim 11, wherein the utilization threshold comprises a threshold percentage, a portion of all requests to permit equipment of a plurality of subscribers of the mobile service provider to access the subscribed service via a wireless access terminal being evaluated according to the threshold percentage in a repeatable manner, such that a particular subscriber device of the equipment of the plurality of subscribers is denied access to the subscribed service via the wireless access terminal.

15. The method of claim 11, wherein the conditional access is managed via an authentication function of a core network of the mobile service provider.

16. A non-transitory, machine-readable medium, comprising executable instructions that, when executed by a processing system including a processor, facilitate performance of operations, the operations comprising:
receiving a request to permit equipment of a subscriber of a mobile service provider that provides a subscribed service via a licensed frequency spectrum to access the subscribed service via a wireless access terminal according to an unlicensed frequency spectrum;
identifying a radio, to obtain an identified radio, adapted to provide access to the subscribed service via the licensed frequency spectrum, wherein the wireless access terminal resides within a wireless coverage area of the identified radio;
determining an identity of the equipment of the subscriber;
mapping the identity of the equipment of the subscriber to a mapped value within a predetermined range;
determining a utilization threshold of the identified radio;
mapping the utilization threshold to the predetermined range to obtain a mapped threshold;

comparing the mapped value to the mapped threshold to obtain a comparison result;

determining a utilization of the identified radio; and initiating a response to the request according to the utilization of the identified radio, the comparison result and the identity of the equipment of the subscriber, wherein access to the subscribed service via the wireless access terminal is conditional according to the response to the request, resulting in conditional access.

17. The non-transitory, machine-readable medium of claim 16, wherein the mapping the identity comprises implementing a hash function that maps the identity of the equipment of the subscriber to the predetermined range being between 0 and 99.

18. The non-transitory, machine-readable medium of claim 16, wherein the mobile service provider provides access to the subscribed service via the licensed frequency spectrum according to a 3GPP protocol.

19. The non-transitory, machine-readable medium of claim 16, wherein the utilization threshold comprises a threshold percentage, a portion of all requests to permit equipment of a plurality of subscribers of the mobile service provider to access the subscribed service via a wireless access terminal being evaluated according to the threshold percentage in a repeatable manner, such that a particular subscriber device of the equipment of the plurality of subscribers is denied access to the subscribed service via the wireless access terminal.

20. The machine-readable medium of claim 16, wherein the conditional access is managed via an authentication function of a core network of the mobile service provider.

* * * * *